May 14, 1946. A. R. WOOLFOLK 2,400,184
ELECTROMAGNETIC DEVICE
Filed Nov. 29, 1943 2 Sheets-Sheet 1
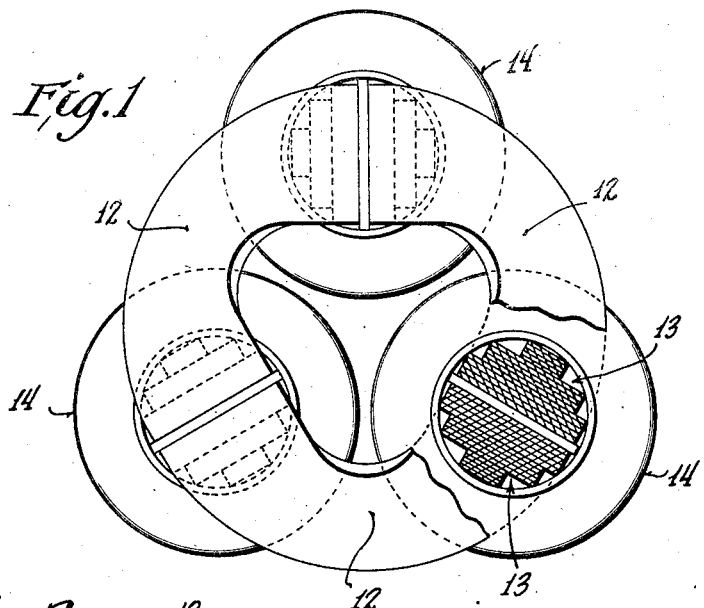
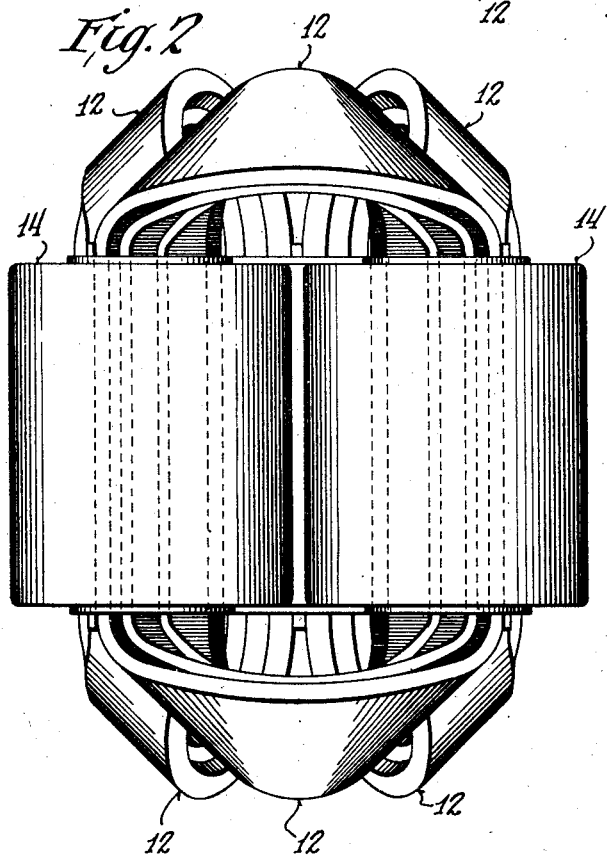
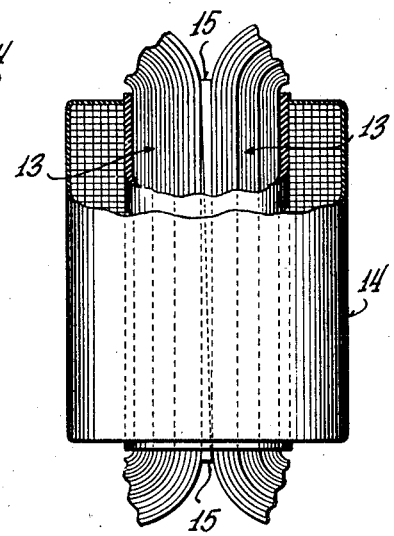
INVENTOR.
Arthur R. Woolfolk

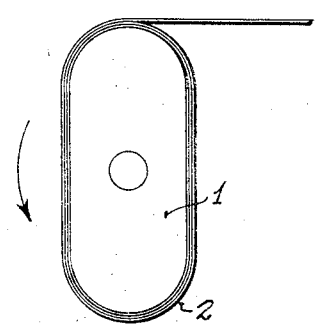
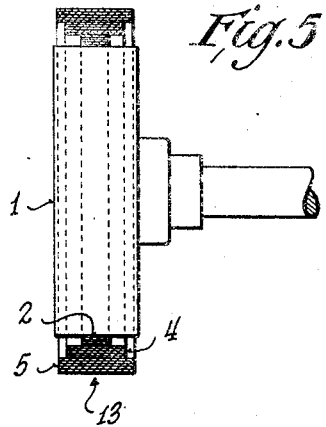
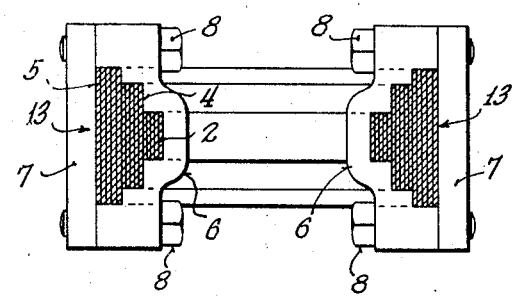
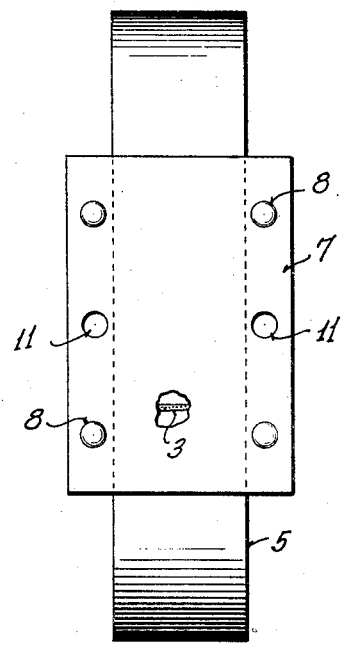
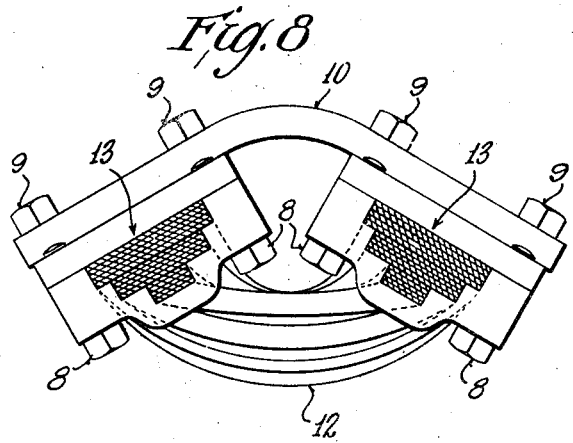

Patented May 14, 1946

2,400,184

UNITED STATES PATENT OFFICE 2,400,184

ELECTROMAGNETIC DEVICE

Arthur R. Woolfolk, Wauwatosa, Wis., assignor to Line Material Company, South Milwaukee, Wis., a corporation of Delaware Application November 29, 1943, Serial No. 512,134

5 Claims. (Cl. 175—356)

This invention relates to an electromagnetic device and to the method of making the same and is particularly directed to a three phase transformer and to the method of making the same.

Three phase transformers have heretofore been made of the stacked core construction in which a multitude of pieces of flat core steel were joined together by stacking to form the necessary shape of core for the three groups of conducting winding assemblies of the three phase transformer. This stacking operation entailed a high labor cost due to the long process of interleaving all of the small pieces of steel. Even in the initial stacking operation some mechanical stress was always imparted to the core pieces in the practical manufacture of the transformer and this reduced the efficiency of the transformer. Also in the stacked core construction it is necessary for the magnetic flux to traverse a multitude of air gaps and to travel cross grain at the corners of the core and this entailed a certain amount of loss in the core of the transformer.

This invention is designed to overcome the above noted defects, and objects of this invention are to provide a novel form of three phase transformer which has its core structure formed of wound magnetic ribbon, which is wound into three closed cores each preferably composed of a plurality of sections, in which no unusual care is required in the assembly of the parts of the device, in which no bending, machining or other working of the core structure is required after annealing and which therefore provides a finished core free from stresses, and in which short-circuiting of the laminations is avoided as the oxide film formed on the laminations is preserved and is not scraped off as there is no working subsequent to annealing.

Further objects are to provide a three phase transformer which has three identical cores each having a pair of straight leg portions with their planes at an angle to each other and with the straight leg portions joined by outwardly arched end portions and with each of the three conducting winding assemblies including the primaries and secondaries surrounding a straight leg portion of two of the cores, with the cores extending from the window of one conducting winding assembly directly through the window of the next conducting winding assembly, and with the cores free from transverse cuts or gaps thereby providing a three phase transformer which requires a low exciting current for the transformer, and thus allows a more economical design of the three phase transformer by increasing the flux density and yet not exceeding the allowable limits of exciting current, and in which the path of the magnetic flux follows the grain in the magnetic ribbon due to rolling, thus furthering economy by reducing core losses and exciting current and allowing the material to be worked economically.

Further objects are to provide a three phase transformer having three cores each of which is formed of a plurality of closed wound sections with two cores interlinking with a conducting winding assembly and with the straight leg portions of adjacent cores arranged back to back and jointly forming a cruciform cross-sectional shape to substantially fill the window of the conducting winding assembly, thus providing a good space factor and allowing the winding of the conducting winding assemblies as circular coils with all of the inherent advantages resulting therefrom such as the ability of the conducting winding to resist distorting forces due to short-circuit or similar conditions as the circular coil is considerably stronger than rectangular coils, and in addition to the mechanical strength entails less danger of damaging the insulation during winding than where a rectangular conducting winding assembly is employed as it requires less tension on the wire and no pounding of the coil to make a firm coil.

Further objects are to provide a core construction and the method of making the same for an electromagnetic device in which a plurality of cores for winding assemblies are provided and in which the cores are positioned in a regular manner with their axes parallel and located at the corners of a regular polygon, in which the cores are each formed of magnetic ribbon wound to provide closed cores, with successive cores arranged back to back to form that portion of the core section which receives the conducting winding assembly.

Further objects are to provide a three phase transformer in which the axes of three circular conducting winding assemblies are arranged in parallelism and are located at the apexes of an equilateral triangle and in which the closed wound cores are also symmetrically arranged thus providing a three phase transformer which is symmetrical throughout and which is, therefore, adapted to be mounted in a circular can.

Further objects are to provide a three phase transformer in which the three cores are wound from magnetic ribbon to form closed cores, in which these wound closed cores are each formed with straight leg portions which are joined by curved end portions which are arched outwardly at both ends and which are curved in a gradual and smooth manner without any abrupt change from point to point.

Further objects are to provide a novel method of making a three phase transformer which method contemplates the winding of three closed cores from magnetic ribbon either on a rectangular mandrel or on a circular mandrel in which latter case the cores would be subsequently given a rectangular shape, in either case providing three cores each having two straight leg portions preferably of half cruciform cross-section; the clamping of the straight leg portions and rotation of such portions while they are clamped to cause the laminations in one straight leg portion to be at an angle to the laminations in the other straight leg portion with the connecting end portions outwardly arched in a smooth, gradually varying curve; the subsequent annealing of the cores while they are held clamped in shape and while the straight leg portions are held in their angular relation to each other; and the final winding of three circular conducting winding assemblies each surrounding a straight leg portion of two cores and being wound in place.

An embodiment of the invention is shown in the accompanying drawings, in which:

Figure 1 is a plan view of the transformer with parts broken away and parts in section.

Figure 2 is a side elevation of the transformer.

Figure 3 is a fragmentary view, partly in section and partly broken away, showing the straight leg portions of two of the cores and one of the conducting winding assemblies.

Figure 4 is a view showing one of the steps in the process of making the transformer.

Figure 5 is a view, partly in section, showing how the successive sections of one of the cores are wound on the mandrel.

Figure 6 is a view, partly in section, showing the manner of first clamping the straight leg portions of one of the cores of the three phase transformer.

Figure 7 is a side elevation of the structure shown in Figure 6.

Figure 8 is a view showing the final manner in which the straight leg portions of the core sections are held clamped and with the planes of the laminations of the core sections arranged at an angle to each other prior to annealing.

The method used in making this transformer is to first wind one section of a core of the narrowest magnetic ribbon on a mandrel 1. This section is indicated by the reference character 2. When a sufficient number of layers have been wound, the end is tack welded or brazed. Thereafter the next section of the core is wound of wider magnetic ribbon on the first section. This section is indicated by the reference character 4 and its end is similarly tack welded. Thereafter the outermost section of wider magnetic ribbon indicated at 5 is wound on top of the two previously completed sections and the end of this section is tack welded. One of these tack welds is indicated at 3 in Figure 7. Although three sections have been shown, it is to be understood that any number of sections may be employed. These sections may all be wound on a rectangular mandrel having curved end portions as shown in Figure 4, or may be wound on a circular mandrel and the straight leg portions may be shaped after winding to the rectangular shape as shown in Figure 4. Thereafter the straight leg portions are clamped in any suitable manner as by means of the clamps formed of the portions 6 and 7, which portions are bolted together as indicated at 8. It is to be noted that the innermost portions 6 are shaped to correspond to the half cruciform cross-sectional shape of the wound core.

After the clamping members 6 and 7 have been securely bolted together, they are turned at an angle to each other to the position shown in Figure 8 so that the laminations of the straight leg portions are at an angle to each other and the clamping members are then secured as by means of the bolts 9 to a rigid bracing member 10 so as to hold the straight leg portions in their angular relation to each other. This is readily accomplished as the clamping members may be provided with holes 11 and the bracing member with similar holes to receive the bolts 9.

It is to be noted from a comparison of Figures 6 and 8 that in reality the straight leg portions of a core are rotated and during this rotational movement the arched end portions rock outwardly at opposite ends to form a smooth, gradual arched portion indicated generally by the reference character 12. For the sake of convenience in description, the finished straight leg portions will be indicated generally by the reference character 13.

The magnetic ribbon may consist of any suitable material such as either hot or cold rolled silicon steel. The method described hereinabove is such that no sharp angles or sharp bends are imparted to any portion of the cores and instead the rounded, arched end portions connecting the straight leg portions of a core are gradually curved. This is shown clearly in Figure 2 and it will be seen that there is no abrupt change in curvature from one portion of the arched end portions 12 to any other portion of the arched end portions but that the change in curvature is gradual. In reality the arched end portions 12 are somewhat conical and have their greatest curvature on their inner edges and their least curvature on their outer edges. This is a bending operation which is readily performed and does not require any special care. The arched end portions naturally form themselves as described when the straight leg portions are turned to the position shown in Figure 8.

While the core sections are held in their bent and clamped condition as shown in Figure 8, they are annealed and after annealing the clamping means is removed and the core section will retain its shape.

After annealing there is no working of any sort—no bending, machining or any other type of working done on these core sections—and consequently there is no mechanical stress which would interfere with the magnetic characteristics of the core sections.

It is to be noted from reference to Figure 8 that the straight leg portions are arranged with the laminations in such straight leg portions at an angle of 120° to each other for each core section.

In assembling the transformer the core sections are positioned back to back as shown in Figures 1 and 2, and it is to be noted that when so positioned the straight leg portions of adjacent core sections form cruciform straight leg portions for the conducting winding assemblies indicated at 14. These conducting winding assemblies include both the primaries and the secondaries and may be wound in any suitable manner directly on the cores. They may be wound, for example, on the winding machine disclosed in the patent to Steinmayer et al. No. 2,305,999, of December 22, 1942, for Method and machine for winding coils, or may be wound on the machine disclosed in the patent to Schultz et al. No. 2,334,131, of November 9, 1943, for Machine for winding coils and method of winding coils. These winding assemblies are circular and consequently have all of the inherent advantages resulting therefrom, such as the ability of the conducting winding assembly to resist distorting forces due to short-circuit or similar conditions, as a circular coil is considerably stronger than rectangular coils. In addition to this there is less danger of damaging the insulation during winding than where a rectangular conducting winding assembly is employed as the circular winding requires less tension on the wire and no pounding on the coil to make a firm coil.

After the conducting winding assemblies 14 have been completed, the core sections may be secured in place in any suitable manner. For example, elongated, flat, tapered wedges 15 of insulating material may be driven in from opposite sides as shown in Figure 3 and will lock the core sections in place.

It is to be noted from reference to Figure 1 that the axes of the three conducting windings are parallel and arranged at the apexes of an equilateral triangle. It is also to be noted particularly as set forth hereinabove that there is no sharp bending produced at the connecting arched end portions of the core sections but that the arched end portions are gradually arched and their radius of curvature varies gradually from point to point. This is an important factor in the making of a transformer as it enables the correct bending or angular positioning of the straight leg portions without unduly stressing the material at the curved and smoothly arched end portions.

It is to be noted also that due to the symmetrical arrangement of the transformer as shown most clearly in Figure 1, it is possible to mount the transformer in a circular tank.

It will be seen that a novel three phase transformer and a novel method of producing such transformer as well as a novel form of core construction for a three phase transformer has been provided by this invention. In addition to this it is to be noted that the process of making the transformer may be very rapidly followed and requires a very small number of operations to produce the final transformer.

Each winding assembly surrounds or interlinks two adjacent cores and the magnetic flux does not at any time have to pass from one core to another core.

The magnetic ribbon has a grain due to rolling which extends lengthwise of the ribbon and is most permeable to magnetic flux along the grain, that is to say, lengthwise of the ribbon. This invention utilizes this most permeable path as the magnetic flux is lengthwise of the ribbons in all of the core sections.

Also it is to be noted that a very small exciting current is required as the magnetic ribbon forming the core sections is continuous and is not broken by cross cuts with the resulting air gaps but instead is, as stated, formed of continuous closed wound magnetic ribbon.

While the invention is primarily directed to a three phase transformer, it is to be understood that the core construction, and the method of making the same, may be used for other electromagnetic devices. It is to be noted further that while three main cores and three main winding assemblies have been shown and described, it is possible to use six main cores and six main winding assemblies for a three phase transformer and to still have the axes of the cores parallel and arranged in a regular order and located at the corners of a regular polygon, and, in other types of electromagnetic devices, to use a different number of cores and winding assemblies provided the symmetry of arrangement is preserved by having the axes of the cores parallel and arranged at the corners of a regular polygon.

Although this invention has been described in considerable detail, it is to be understood that such description is intended as illustrative rather than limiting, as the invention may be variously embodied and is to be interpreted as claimed.

I claim:

1. A core construction for an electromagnetic device comprising three cores each having two straight leg portions joined by end portions, said cores being closed cores formed of flatwise wound magnetic ribbon, the end portions being arched outwardly in a smooth and gradual curve and each forming approximately a part of a cone, said cores being arranged with the straight leg portions of each core arranged back to back with straight leg portions of the other two cores, all of said cores being annealed and being free from strains due to mechanical working.

2. A core construction for an electromagnetic device comprising three cores each having two straight leg portions joined by end portions, said cores being closed cores formed of flatwise wound magnetic ribbon, the end portions of each core being arched outwardly in opposite directions in a smooth and gradual curve and the planes of the ribbon in the straight leg portions of each core being arranged at an angle to each other, said cores being arranged with the straight leg portions of each core arranged back to back with straight leg portions of the other two cores, each of said cores being formed of a plurality of sections formed of magnetic ribbon of different widths with the smallest width section on the inner side and the longest width section on the outer side of each of said cores, the adjacent leg portions of successive core sections having jointly a cruciform cross-section.

3. A core construction for an electromagnetic device comprising three substantially identical closed cores each having two straight leg portions joined by end portions, said cores being formed of flatwise wound magnetic ribbon, the ribbon in the two straight leg portions of each core being arranged at an angle to each other, said cores being arranged with the straight leg portions of each core arranged back to back with a straight leg portion of each of the other two cores, the straight leg portions of each core being joined by end portions with the faces of the ribbons of the end portions slanting inwardly towards each other at the outer side of the cores.

4. A core construction for an electromagnetic device comprising a plurality of cores each having two straight leg portions joined by end portions, said cores being closed cores formed of flatwise wound magnetic ribbon, the end portions being arched outwardly and each forming approximately a portion of a cone, said cores being arranged with the straight leg portions of each core arranged back to back with straight leg portions of adjacent cores and with the pairs of straight leg portions located at the corners of a regular polygon, all of said cores being annealed and being free from strains due to mechanical working after annealing.

5. A core construction for an electromagnetic device comprising three cores each having two straight leg portions joined by end portions, said cores being closed cores formed of flatwise wound magnetic ribbon, the end portions being arched outwardly in a smooth and gradual curve and each forming approximately a part of a cone, said cores being arranged with the straight leg portions of each core arranged in parallelism with and closely adjacent straight leg portions of the other two cores, all of said cores being annealed and being free from strains due to mechanical working after annealing.

ARTHUR R. WOOLFOLK.